United States Patent Office 3,600,337
Patented Aug. 17, 1971

3,600,337
PROCESS OF MAKING EPOXY
CELLULAR PLASTICS
Edgar Fischer and Ernst Nölken, Frankfurt am Main,
Germany, assignors to Farbwerke Hoechst Aktiengesellschaft vormals Meister Lucius & Brüning, Frankfurt am Main, Germany
No Drawing. Filed Mar. 7, 1968, Ser. No. 711,180
Claims priority, application Germany, Mar. 10, 1967,
F 57,786
Int. Cl. C08f 47/10; C08j 1/16, 1/26
U.S. Cl. 260—2.5         5 Claims

ABSTRACT OF THE DISCLOSURE

Epoxy cellular plastics are produced by foaming and curing an epoxy resin in the presence of a blowing agent, an aliphatic or cycloaliphatic polyhydric alcohol and a Lewis acid or an addition- or complex compound of a Lewis acid.

---

The present invention provides epoxy cellular plastics and a process for preparing them by adding polyhydric secondary alcohols, especially bis-(4-hydroxy-cyclohexyl)-methane or the derivatives thereof.

It is known that cellular plastics can be prepared by polymerizing epoxy resins in the presence of blowing agents and while adding pore-regulating agents.

As polymerization catalysts there have been proposed boron trifluoride, aluminium chloride, tin-(IV)-chloride, iron-(III)-chloride, zinc chloride, antimony-(V)-chloride and complex compounds of boron trifluoride with, for example, the following complexing agents: water, diethyl ether, acetic acid, acetic anhydride, phenol, a mono-functional alcohol such as methanol, ethanol, propanol, isopropanol, butyl alcohol and hexyl alcohol, a di- or a more than difunctional liquid alcohol such as ethylene glycol, diethylene glycol, triethylene glycol and polyethylene glycol having a molecular weight of up to 800.

As solvents for these catalysts there are used the aforesaid complexing agents such as ethers, carboxylic acids, carboxylic anhydrides or alcohols as such or organic phosphites such as triphenyl phosphite, halohydrocarbons such as chloroform, ketones such as acetone and methylethyl-ketone or esters such as ethyl acetate. The cellular plastics prepared by the aforesaid known process often exhibit considerable deficiencies, for example non-uniform pore sizes, shrinkage and warpings as well as cracks. Especially, the known polymerization processes do not provide unobjectionable epoxy cellular plastics in large blocks, for example having a volume of 20 liters.

We have now found that cellular plastics can be prepared by polymerization of epoxy resins in the presence of pore-regulating agents and blowing agents, by adding to the mixture to be foamed polyhydric cycloaliphatic alcohols containing two secondary hydroxyl groups, and using as a polymerization catalyst a Lewis acid or an addition- or complex compound of a Lewis acid.

Especially advantageous is the use of bis-secondary alcohols of the following formula

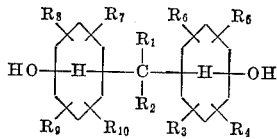

in which $R_1$ to $R_{10}$ may be identical or different, each representing a hydrogen atom, an alkyl group, preferably having from 1 to 4 carbon atoms, or a halogen atom, in particular chlorine. Suitable compounds of the aforesaid general formula are, for example, bis-(2-hydroxy-cyclohexyl)-methane, (2 - hydroxy-cyclohexyl) - (4 - hydroxy)-methane, 1,1 - bis - (4-hydroxy-cyclohexyl)-ethane, 2.2-bis-(4-hydroxy-tetrachloro-cyclohexyl)-propane, 2.2-bis-(4-hydroxy-tetrabromo-cyclohexyl)-propane, 2.2-bis-(4-hydroxy-cyclohexyl)-butane and 2.2-bis(4-hydroxy-tert.-butyl-cyclohexyl)-propane. Especially suitable are 2.2 - bis - (4-hydroxy-cyclohexyl)-propane and bis(4-hydroxy-cyclohexyl)-methane.

Bis-(hydroxy-cyclohexyl)-methane and the derivatives thereof are prepared by known methods, for example by a hydrogenation of bis-phenols. The bis-phenols used for the hydrogenation may be obtained by a condensation of phenols such as phenol, o-cresol, m-cresol, p-cresol, tert.-butyl-phenol, 2.4-xylenol, 2.6-xylenol, chlorophenol or naphthol with ketones such as acetone, methyl-ethyl-ketone, diethyl-ketone or aldehydes such as formaldehyde, acetaldehyde, chloral or isobutyraldehyde. Hydrogenated 2.2-bis-(4-hydroxy-phenyl)-propane is preferably used for preparing cellular plastics according to the invention.

The alcohols to be used according to the invention are generally employed in proportions ranging from 1 to 50, preferably 2 to 30, percent by weight, calculated on the epoxy resins.

Some of the aforesaid bis-(hydroxy-cyclohexyl)-compounds are only partially soluble in the epoxy resin at room temperature. To obtain a finely divided dispersion of these cyclohexanol-derivatives in the epoxy resin, the derivatives are dissolved in the epoxy resin while heating and stirring and, if desired, simultaneously adding a pore-regulating agent, and then the solution is cooled. It is also possible to mix, for example, bis-(hydroxy-cyclohexyl)-methane or the derivatives thereof in a finely divided distribution with the liquid epoxy resin or to use auxiliary liquids for dissolving, for example, bis-(hydroxy-cyclohexyl)-methane or the derivatives thereof in the epoxy resin. As auxiliary liquids there may be mentioned ethers such as diethyl ether, di-isopropyl ether, dioxane, ethylene glycol dimethyl ether, diethylene glycol dimethyl ether and diethylene glycol diethyl ether; alcohols such as methanol, ethanol, propanol, isopropanol, butyl alcohol, hexyl alcohol, diethylene glycol monobutyl ether, ethylene glycol, diethylene glycol, triethylene glycol and butane-diol-(1.4); halohydrocarbons such as methylene chloride and chloroform; ketones such as acetone, methyl-ethyl-ketone and methyl-isobutyl-ketone or esters such as ethyl acetate and butyl acetate.

By epoxy resins there are to be understood compounds having at least 2, preferably from 2 to 10, epoxy groups in the molecule, for example reaction products of epichlorhydrin with polyhydric alcohols and in particular with mono- and polynuclear polyvalent phenols. Di- and polyglycidyl esters may also be used. For foaming up, there are also suitable such compounds which may be obtained by epoxidation of di- and polyolefins, cyclic and acyclic dienes and diolefinically unsaturated carboxylic acid esters. The reaction products containing the said oxirane nuclei can be used as such or in mixture with one another.

Reaction products of 2.2-diphenylol-propane with epichlorhydrin are preferably used. It is furthermore possible to use mixture of epoxy resins with other comonomers which undergo cationic copolymerization with epoxy resins, the proportion of the comonomers being in the range of from 1 to 60, preferably 5 to 30, percent by weight of the mixture of epoxy resin and comonomers. Such comonomers which can be copolymerized with epoxy resins are, for example cyclic ethers such as propylene oxide, epichlorhydrin, phenyl-glycidyl ether, 3.3-bis-(chloromethyl)-oxacyclobutane and tetrahydrofurane. Cyclic acetals such as trioxane or diethylene glycol formal or lactones such as β-propiolactone, γ-butyrol-lactone, δ-valero-lactone, ε-caprolactone, may also be used as comonomers.

For foaming at room temperature, there are preferably used liquid epoxy resins having an epoxide equivalent of from 100 to 300. It is, however, also possible to use solid epoxy resins or epoxy resins having higher epoxide equivalents, as far as they can be obtained in the liquid state by adding solvents or comonomers.

The epoxy resins are foamed in known manner by adding readily evaporating halohydrocarbons such as monofluoro - trichloromethane, monofluoro - dichloromethane, 1.2.2 - trifluoro - trichloro-ethane or methylene chloride. The blowing agent is preferably used in a proportion ranging from 5 to 30% by weight, calculated on the epoxy resin.

To obtain the most uniform possible pores in the cellular plastics, it is furthermore advantageous to add pore-regulating agents, for example silicone oils. Moreover, fillers, dyestuffs, plasticizers or fire-retardant agents may be added to the mixture to be foamed.

As catalysts which initiate the polymerization of the epoxy resin at room temperature, there are suitable Lewis acids such as boron trifluoride, tin tetrachloride, antimony pentachloride, phosphorus pentafluoride and antimony pentafluoride, especially the addition compounds of boron trifluoride with aromatic amines having a $pK_b$-value in the range of from 9 to 16, for example diphenyl-amine, 2,4 - dichloro-aniline, o-phenylene-diamine, o - chloraniline and p-amino-benzoic acid ethyl ester. The use of boron trifluoride complex compounds with aromatic amines is especially advantageous since it permits the pot life of the mixture to be foamed to be adjusted to an appropriate length of time owing to the basicity of the amine.

In order that the catalysts can be thoroughly mixed with the mixture to be foamed within a short period of time, they are dissolved in auxiliary liquids or used as complex compounds, the liquids used being substantially the solvents for the bis-(hydroxy-cyclohexyl)-methane or the derivatives thereof. The concentration of the catalyst in the solvent is preferably in the range of from 10 to 50% by weight and the amount of catalyst is in the range of from 0.01 to 5, preferably from 0.1 to 3, mol-percent, calculated on the average equivalent of the epoxy resin used.

The cellular plastics can be foamed by hand or by means of suitable devices and may be applied by an injection method or used for foaming in given molds. To this effect, the mixture of epoxy resin, silicone oil, blowing agent and bis-(hydroxy-cyclohexyl)-methane or one of the derivatives thereof is stirred with the catalyst solution; it is, however, also possible to feed the catalyst solution, to which a pore-regulating agent and bis-(hydroxy-cyclohexyl)-methane or one of the derivatives thereof have been added, to the epoxy resin containing the blowing agent. For dissolving bis-(hydroxy-cyclohexyl)-methane or the derivatives thereof, there may also be used the aforesaid monomers in admixture with epoxy resins. The components may be mixed by means of a simple mechanical stirrer or in a foaming machine. Mixing of the catalyst and epoxy components ought to have been finished before a substantial liberation of blowing agents sets in. Generally, the mixture may be stirred for 1 to 4 minutes to assure careful homogenizing, whereupon the mixture to be foamed is transferred at once to a mold or onto a moving band. The pot life of the mixture to be foamed depends on the epoxy resin, the catalyst and the temperature chosen.

The foaming process is generally finished within 2 to 20 minutes and the cross-linking reaction yielding the rigid cellular plastic, is essentially complete after a period of from 10 minutes to 1 hour even at room temperature.

Compared with the cellular plastics obtained by hitherto used processes, the epoxy cellular plastics prepared according to the invention are distinguished by a particular homogeneity of the pore sizes, by the absence of shrinkage, a higher thermostability and weak tendency to cracking, especially in large cellular plastic blocks. These improved properties partially result from the fact that the batch to be foamed remains viscous until reaching its full expanding height owing to the additives of the invention and that, therefore, the blowing agent can become fully effective before gel formation occurs and the cellular plastic block becomes rigid and free from stickiness. According to this method, tensions within the cellular plastic block are avoided and epoxy cellular plastics having particularly low unit weights can be obtained.

The cellular plastics made according to the invention may be used as packing material, in sandwich constructions and as insulating material against cold, warmth, sound and shock as well as in the field of electrical engineering. They are furthermore distinguished by a particularly good adhesion to materials such as metals, for example steel, aluminium; and cardboard, bricks, ceramics and plastic materials.

The following examples serve to illustrate the invention, but they are not intended to limit it thereto, the parts being by weight. Where solutions are said to be of a particular strength, this is by weight based on the weight of the solution. The epoxy resin A is a diglycidyl ether of 2.2-bis-(4-hydroxyphenyl)-propane having an epoxide equivalent of 190, and the epoxy resin B is a diglycidyl ether of 2.2-bis(4 - hydroxy - phenyl)-propane having an epoxide equivalent of 500. The silicone oil used is a commercial product manufactured by the Union Carbide Corporation and designated as L 531.

EXAMPLE 1

700 parts of epoxy resin A,
300 parts of epoxy resin B,
154.5 parts of 2.2-bis-(4-hydroxy-cyclohexyl)-propane,
10 parts of silicone oil and
150 parts of trichloro-fluoromethane were mixed and 6 parts of a boron trifluoride/o-chloraniline complex compound in a solution of 12 parts of diethylene glycol dimethyl ether were added thereto while stirring within 3 minutes. After a period of 3 minutes, during which the mixture to be foamed was transferred to a mold, foaming set in. After 6 minutes, the foam reached its full expanding height and became rigid and free from stickiness. When cool, the cellular plastic block did not show any shrinkage at all and filled the given mold entirely. Sheets cut from the cellular plastic block had very fine pores, were resistant to abrasion and showed no cracks. The resistance to compression per unit of area was 2.2 kilograms/cm.$^2$ for a density of 32 grams per liter. The cellular plastic block had a closed cell proportion of 86%.

When the 154.5 parts of 2.2-bis-(4-hydroxy-cyclohexyl)-propane were replaced by the same molar amount of butane-diol(1.4), i.e. 58 parts, the cellular plastic block obtained had a medium pore size and a poorer resistance to abrasion than that disclosed above and showed many small cracks in its interior. Its resistance to compression per unit of area, at a density of 36 grams per liter, was only 1.2 kilograms per cm.$^2$ When operating as disclosed above, but replacing 2.2-bis-(4-hydroxy-cyclohexyl)-propane by the same parts of butane-diol-(1.4), the cellular plastic block obtained shrank considerably when cool.

EXAMPLE 2

700 parts of epoxy resin A
300 parts of epoxy resin B
103 parts of 2.2-bis-(4-hydroxy-cyclohexyl)-propane
10 parts of silicone oil and
150 parts of trichloro-monofluoro-methane were mixed and 5 parts of a boron trifluoride/o-chloraniline complex compound in a solution of 10 parts of diglycol dimethyl ether were added thereto, while stirring, at 25° C. and within 2 minutes. The mixture to be foamed was then filled into a mold. After 4 minutes, foaming set in and after 16 minutes the foam had reached its full expanding height and became rigid and free from stickiness. There was obtained a cellular plastic block which had a high dimensional stability, uniform fine pores, a high resistance to abrasion and its interior showed no cracks at all. At a density of 26 grams per liter, it had a resistance to compression per unit of area of 1.6 kilograms per cm.$^2$. The percentage of open cells was 86.

When 2.2-bis(4-hydroxy-cyclohexyl)-propane was replaced by the same number of mols of diethylene glycol or hexane-diol-(1.6), i.e. 45.6 and 51 parts respectively, the plastic blocks obtained had a medium pore size, showed numerous small cracks and had a poorer resistance to abrasion than that disclosed in Example 2.

When 2.2-bis(4-hydroxy-cyclohexyl)-propane was replaced by the same parts of diethylene glycol or hexane-diol-(1.6), there were obtained soft cellular plastic blocks having medium-sized pores, which showed very many cracks in their interior and shrank considerably when cool.

EXAMPLE 3

700 parts of epoxy resin A
300 parts of epoxy resin B
136 parts of bis-(4-hydroxy-cyclohexyl)-methane and
10 parts of silicone oil were mixed while heating at 80° C. After having been cooled to 30° C., this mixture was added while stirring to 150 parts of trichloro-fluoro-methane and then to a solution of 6 parts of a boron trifluoride/o-chloraniline complex compound in 12 parts of diglycol dimethyl ether, at 23° C. and within 5 minutes. The mixture to be foamed was filled into a cubic mold having a capacity of 30 liters. After 5 minutes, foaming set in and after another 10 minutes, the mold was entirely filled with the cellular plastic which was free from stickiness. After cooling there was obtained a homogeneous cellular plastic block which had fine pores, did not shrink and had a density of 38 grams per liter.

EXAMPLE 4

700 parts of epoxy resin A
300 parts of epoxy resin B
154.5 parts of 2.2-bis-(4-hydroxy-cyclohexyl)-propane and
10 parts of silicone oil were mixed while heating at 100° C. After having been cooled to 30° C., the mixture was added, while stirring, at 25° C., and within 4 minutes to 250 parts of trichlorofluoromethane and then to 7 parts of a boron trifluoride/o-chloroaniline complex compound in a solution of 14 parts of diglycol dimethyl ether. The mixture to be foamed was poured into a vertical mold having the dimensions 100 x 30 x 8 centimeters, in which the foam reached its full expanding height after 10 minutes, became free from stickiness after another 3 minutes and filled the mold completely. There was obtained a homogeneous cellular plastic plate having a medium pore size, a good resistance to abrasion and a high dimensional stability. Its resistance to compression per unit of area was 1.5 kilogram per cm.$^2$ for a density of 23 grams per liter. Its percentage of closed cells was 78.

What is claimed is:

1. In a process for preparing cellular plastics by curing polyepoxide resins in a reaction mixture containing a volatile liquid blowing agent and a Lewis acid type polymerization catalyst, the bnprovement which comprises incorporating in the reaction mixture a polyhydric alcohol having the formula

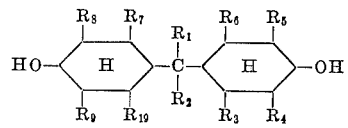

in which R to $R_{10}$ may be the same or different and each represents a hydrogen atom, an alkyl group or a halogen atom to produce a cellular plastic having improved pore size homogeneity and reduced internal tension.

2. In a process for preparing cellular plastics by curing polyepoxide resins in a reaction mixture containing a volatile liquid blowing agent and a Lewis acid type polymerization catalyst, the improvement which comprises incorporating in the reaction mixture a polyhydric alcohol having the formula

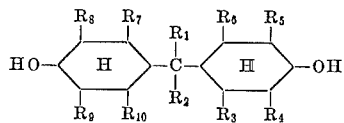

in which $R_1$ to $R_{10}$ may be the same or different and each represents a hydrogen atom, an alkyl group of 1 to 4 carbon atoms or a chlorine atom to produce a cellular plastic having improved pore size homogeneity and reduced internal tension.

3. A process according to claim 2 wherein the polyhydric alcohol is 2,2-bis-(4-hydroxy-cylohexyl)-propane.

4. A process according to claim 2 wherein the polyhydric alcohol is 2,2-bis-(4-hydroxy-cyclohexyl)-methane.

5. A process according to claim 2 wherein the polyhydric alcohol is used in an amount of 1 to 50% by weight, based on the weight of epoxy resin.

References Cited

UNITED STATES PATENTS 3,373,121   3/1968   Burgert et al. _____260—2.5EP

MURRAY TILLMAN, Primary Examiner

M. FOELAK, Assistant Examiner

U.S. Cl. X.R.

260—29.1, 31.2, 31.4, 32.8, 33.2, 33.4, 33.8, 47, 830